W. BRADFORD.
Plow.
No. 160,385. Patented March 2, 1875.
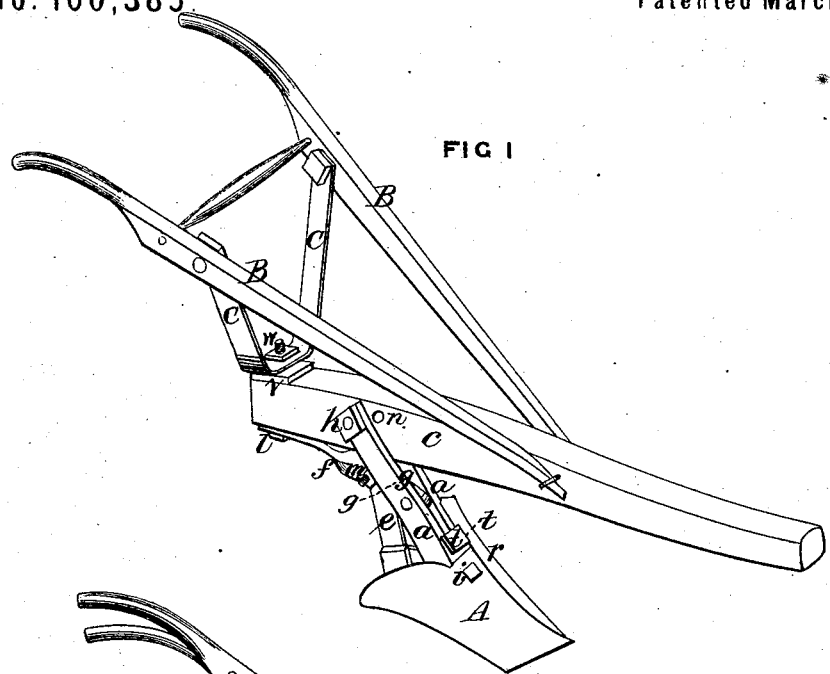
FIG I
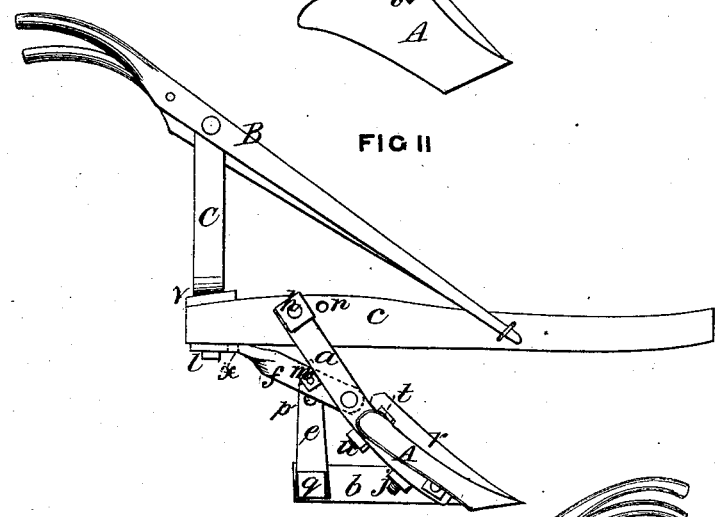
FIG II
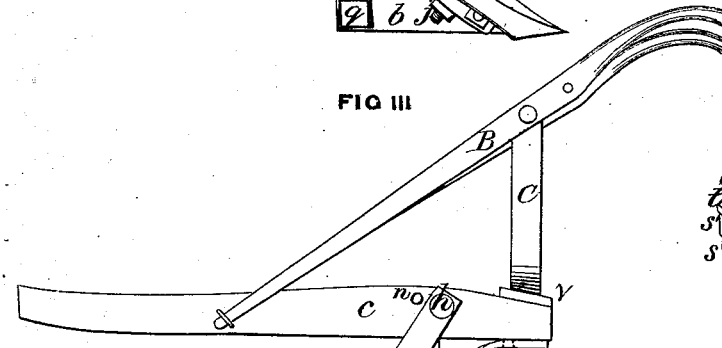
FIG III
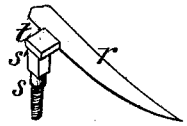
FIG IV
WITNESSES
John E. Laing
J. H. Rutherford
INVENTOR
William Bradford
By Johnson & Johnson
his Attys.

UNITED STATES PATENT OFFICE.

WILLIAM BRADFORD, OF VALDOSTA, GEORGIA.

IMPROVEMENT IN PLOWS.

Specification forming part of Letters Patent No. 160,385, dated March 2, 1875; application filed December 7, 1874.

*To all whom it may concern:*

Be it known that I, WILLIAM BRADFORD, of Valdosta, in the county of Lowndes and State of Georgia, have invented certain new and useful Improvements in Combined Plow and Cotton-Scraper; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to plows in which the mold-board is made interchangeable with sweeps, half-shovel, and plain scooter, for adapting the plow for breaking land or cultivating and scraping between cotton rows; and my said invention consists of a brace combined with a bent foot-bar, a heel-bar, and the beam in a manner that the three points of attachment of these parts will be arranged above the plowshare, for the purpose of relieving the pivot-joints of the heel and land-side bars from the great strain upon the foot-bar and its brace, and thereby rendering the adjusting devices more durable.

In the accompanying drawings, Figure 1 represents a view, in perspective, of a plow embracing my invention; Fig. 2, a view of the mold-board side thereof; Fig. 3, a view of the land-side thereof, and Fig. 4 a detached view of the cutter.

The frame of the plow consists of an inclined double-bent foot-bar, $a$, and a loose bar, $b$, the former embracing the beam $c$, and serving as a seat for the plowshare A, while the base-bar connecting the plowshare is also connected by a heel-bar, $e$, with a brace, $f$, secured to the beam $c$ and the bent foot-bar. These parts are combined and united for co-operative adjustment, as may be required for adaptation for interchangeable plowshares and scrapers, as will be described hereinafter. The foot-bar $a$ consists of a bar with a space, $g$, between its bent sides $a\ a$, and is secured by a screw-bolt, $h$, passing through the sides and the beam on each side thereof. The plowshare A, or other cultivating implement, is seated upon the foot-bar $a$, and securely clamped by a screw-bolt, $i$, passed through the space $g$, and a nut, $j$, clamped against the under side of the bar $a$, to allow the mold-board to be easily adjusted and removed when required. When a mold-board is used for plowing, as shown in the drawings, the base-bar $b$ becomes the land-side; but when scrapers or scooters are used it forms a center bar, with the wings of the scrapers on each side. The foot-bar is secured by a clamp-bolt, $h$, passing through the ends of the bar $a$, and serves as a pivot on which it may be adjusted. The brace $f$ is riveted between the arms of the bent bar $a$, and secured to the under side of the beam by screw-bolt $l$; and the heel-bar $e$ is secured to the brace $f$ by a screw-bolt, $m$. The three points of connection $h\ l\ m$ are made adjustable—viz., the bar $a$ by the holes $n$ in the beam to give it more or less angle with the beam, the brace $f$ by the holes $x$, and the heel-bar $e$ by the holes $p$, in order to correspond with the adjustment of the foot-bar. This adjustment of the foot-bar $a$ is to increase its angle with the beam when scrapers are to be used, to cause them to skim over the surface of the ground, and is made by changing the upper end of the foot-bar into the forward holes $n$, adjusting the brace $f$ backward and the heel-bar $e$ upward, in order to bring and maintain the base-bar horizontally when the foot-bar $a$ is set backward. In this adjustment of the heel-bar it turns upon its screw-bolt connection $q$ with the base-bar. A cutter, $r$, is combined for use with the plowshare A for cutting roots and turf, and it is secured in place by a screw-bolt, $s$, with a square shank, $s'$, Fig. 4, extending from an arm, $t$, and passing through the space $g$, to receive a clamp-nut, $u$, bearing against the under side of the foot-bar, so that the cutter and the plowshare are adjusted independently of each other within the same open space of the bent foot-bar. This enables both the cutter and the plowshare to be removed and a scraper or scooter of any desired shape secured in their place. The adjustment of the plow-frame as described increases or diminishes the distance of the base-bar from the beam, and to compensate for this I make the handles B adjustable by means of a yoke, C, attached to the handles and seated upon removable blocks $v$ on the rear end of the plow-beam, upon which the yoke, the adjusting-blocks, and adjusting-brace $f$ are secured by the same screw-bolt, the nut $w$ whereof clamps the parts together. In this way the handles are adjusted to suit a high or low adjustment of the plow by inserting one or more blocks, $v$, between the end of the yoke and the top of the beam, or removing said blocks from beneath the yoke.

I claim—

The brace $f$, combined with the bent foot-bar $a$, the heel-bar $e$, and the beam, with the three points of attachment $g$ $m$ $l$ of these parts arranged above the plowshare, as described, whereby the pivots of the heel-bar $e$ and the land-side $b$ are relieved from the strain upon the foot-bar and its brace.

In testimony that I claim the foregoing as my own I have affixed my signature in presence of two witnesses.

WILLIAM BRADFORD.

Witnesses:
 T. R. SMITH,
 THOMAS M. COOK.